(12) United States Patent
Wang et al.

(10) Patent No.: US 10,189,489 B2
(45) Date of Patent: Jan. 29, 2019

(54) OFFLINE VARIABLE MONITORING SYSTEM AND METHOD FOR MPUS OF AN EMU TRAIN

(71) Applicant: CRRC QINGDAO SIFANG ROLLING STOCK RESEARCH INSTITUTE CO., LTD., Qingdao (CN)

(72) Inventors: Kai Wang, Qingdao (CN); Hengliang Zheng, Qingdao (CN); Junqiang Tian, Qingdao (CN); Huixing Fan, Qingdao (CN); Huiyong Gao, Qingdao (CN); Shaoli Wang, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 33 days.

(21) Appl. No.: 15/539,975

(22) PCT Filed: Sep. 18, 2016

(86) PCT No.: PCT/CN2016/099188
§ 371 (c)(1),
(2) Date: Jun. 26, 2017

(87) PCT Pub. No.: WO2017/084426
PCT Pub. Date: May 26, 2017

(65) Prior Publication Data
US 2018/0015936 A1    Jan. 18, 2018

(30) Foreign Application Priority Data
Jun. 8, 2016 (CN) .......................... 2016 1 0401877

(51) Int. Cl.
*B61L 15/00* (2006.01)
*B61C 3/00* (2006.01)
(Continued)

(52) U.S. Cl.
CPC ............ *B61L 15/0081* (2013.01); *B61C 3/00* (2013.01); *B61L 15/0072* (2013.01);
(Continued)

(58) Field of Classification Search
CPC .... B61C 3/00; B61L 15/0072; B61L 15/0081; G05B 15/02; G05B 2219/15073; G05B 23/0213; H04L 67/12; H04L 69/16
See application file for complete search history.

(56) References Cited

U.S. PATENT DOCUMENTS

| 6,032,905 A * | 3/2000 | Haynie ............... B61L 27/0038 246/167 R |
| 2011/0099413 A1* | 4/2011 | Cooper ............... B61L 15/0027 714/4.1 |

(Continued)

FOREIGN PATENT DOCUMENTS

| CN | 201051254 Y | 4/2008 |
| CN | 102149225 A | 8/2011 |

(Continued)

OTHER PUBLICATIONS

Hu, Chuan et al., "Research on Sampling Plan of Reliability Verification Test for the EMU" Railway Locomotive & Car; vol. 33, No. 2; Apr. 2013; pp. 87-92 (Abstract).
(Continued)

*Primary Examiner* — Tyler J Lee
(74) *Attorney, Agent, or Firm* — J.C. Patents

(57) ABSTRACT

The present invention relates to an offline variable monitoring system and method for MPUs of an EMU train, comprising a serial port unit, an Ethernet interface, a TF card
(Continued)

interface and a status indicator, which are all electrically connected to a main control unit; the main control unit is connected to a PC and TF expansion card via the Ethernet interface and the TF card interface separately, and records monitored offline variable values into the TF expansion card. The monitoring method comprised three operating modes: a configuration mode, a working mode and a download mode, which realize the monitoring of offline variables by using a multithread operating system including a TCP/IP communication thread, a main control thread and a serial port data monitoring thread. The way of recording the monitored data may be configured flexibly; and the monitoring of four central control units MPUs of the EMU train may be realized.

8 Claims, 2 Drawing Sheets

(51) Int. Cl.
    *G05B 15/02*     (2006.01)
    *H04L 29/08*     (2006.01)
    *G05B 23/02*     (2006.01)
    *H04L 29/06*     (2006.01)

(52) U.S. Cl.
    CPC ......... *G05B 15/02* (2013.01); *G05B 23/0213* (2013.01); *H04L 67/12* (2013.01); *G05B 2219/15073* (2013.01); *H04L 69/16* (2013.01)

(56) References Cited

U.S. PATENT DOCUMENTS

| | | | | |
|---|---|---|---|---|
| 2011/0270475 | A1* | 11/2011 | Brand | B61L 15/0027 701/20 |
| 2013/0079959 | A1* | 3/2013 | Swanson | B61C 17/12 701/19 |
| 2013/0261842 | A1* | 10/2013 | Cooper | B61L 15/0081 701/1 |
| 2014/0114507 | A1* | 4/2014 | Kernwein | B61L 15/0063 701/19 |
| 2014/0129060 | A1* | 5/2014 | Cooper | B61L 15/0027 701/19 |
| 2014/0129061 | A1* | 5/2014 | Cooper | B61L 15/0036 701/19 |
| 2014/0156122 | A1* | 6/2014 | Wiemeyer | B61C 17/12 701/19 |
| 2015/0200712 | A1* | 7/2015 | Cooper | H04B 3/54 375/257 |
| 2015/0217790 | A1* | 8/2015 | Golden | B61L 15/0072 701/19 |

FOREIGN PATENT DOCUMENTS

| | | |
|---|---|---|
| CN | 102303628 A | 1/2012 |
| CN | 102520324 A | 6/2012 |
| CN | 103281381 A | 9/2013 |
| CN | 103529789 A | 1/2014 |
| CN | 203658776 U | 6/2014 |
| CN | 103986758 A | 8/2014 |
| CN | 104104714 A | 10/2014 |
| CN | 104901839 A | 9/2015 |
| EP | 2 584 421 A2 | 4/2013 |
| JP | 2008-40698 A | 2/2008 |
| JP | 5812595 B2 | 11/2015 |
| RU | 2 400 794 C1 | 9/2010 |

OTHER PUBLICATIONS

International Search Report of corresponding International PCT Application No. PCT/CN2016/099188, dated Mar. 1, 2017.

The extended European Search Report of corresponding European patent application No. 16865604.9-1204/3214518, dated Jan. 31, 2018.

The Chinese Search Report of corresponding China patent application No. 2016104018770, dated Feb. 23, 2018.

The Russian Search Report for the Invention of corresponding Russia Federation patent application No. 201726054/11(044841), dated Mar. 26, 2018.

* cited by examiner

OFFLINE VARIABLE MONITORING SYSTEM AND METHOD FOR MPUS OF AN EMU TRAIN

CROSS-REFERENCE TO RELATED APPLICATION

This application is a national phase application of international application No. PCT/CN2016/099188 filed on Sept. 18, 2016, which in turn claims the priority benefits of Chinese application No. 201610401877.0 filed on Jun. 8, 2016. The contents of these prior applications are hereby incorporated by reference in its entirety.

TECHNICAL FIELD

The present application relates to a monitoring method and in particular to an offline variable monitoring system and method for MPUs of an EMU train.

BACKGROUND

A central control unit MPU (Micro Processor Unit) of a CRH5 (China Railway High-speed 5) type train is a core control component for EMU (Electric Multiple Unit) trains, and control logic operations of various subsystems are in the central control unit MPU. If relatively key logic control variables change unexpectedly during the operation, the control logics for an EMU train will become disordered, resulting in faults. In this case, the EMU is to be slowed down or stopped for examination. Therefore, monitoring the control variables is an important approach for the trouble shooting of the EMU train.

As the prior central control units for CRH5 type trains, the central control unit MPU monitoring software Serlink developed by Alston is used, specifically:

1. a personal notebook computer and an MPU apparatu are connected via a serial port;
2. the Serlink software is started, and there is a prompt for loading an MAP file;
3. logic control variables to be monitored are added into the Serlink software; and
4. The monitoring of the logic control variables is started by clicking "START", and the value of a control variable at the current moment will be displayed below each column of corresponding control variables.

Wherein, the MAP file in the Serlink software is a document file in which the name of the logic control variables corresponds to the address of the logic control variables. The MAP file is displayed in the Serlink software in such a way that the variable name is displayed in the first row, and the address of the variable corresponding to the current variable name is displayed in the second row. When the serial port is communicated with the central control unit MPU, the monitored logic control variable address is transmitted to the central control unit MPU; and, when the central control unit MPU returns data, the corresponding logic control variable name is obtained from the logic control variable address.

When monitoring the logic control variables of the central control unit MPU for the CRH5 type train, the Serlink software has the following problems.

First, monitoring can be conducted only when a personal notebook computer is connected to the central control unit MPU. However, since the central control unit MPU is mounted inside an electrical cabinet, the PC (Personal Computer) can be connected thereto only after the electrical cabinet on the EMU train is opened. This operation method is somewhat risky in monitoring the logic control variables when the train is running.

Second, it is required to designate a person to take charge of the process of monitoring the logic control variable data.

Third, the configuration is not flexible because the recording of data is triggered only when one of the logic control variables to be monitored changes. As a result, the monitoring requirements in changeable and complicated environments cannot be fulfilled.

Fourth, it is unable to realize long-term monitoring and recording.

Fifth, when the Serlink software is used to monitor central control unit MPU apparatuses, one notebook computer can monitor only one central control unit MPU apparatus, resulting in low flexibility.

BRIEF SUMMARY OF THE INVENTION

An objective of the present application is to provide an offline variable monitoring system and method for MPUs of an EMU train, which can realize the continuous offline monitoring of logic control variables and improve the reliability and flexibility of the offline variable monitoring.

The present application employs the following technical solutions. The present application discloses an offline variable monitoring system for MPUs of an EMU train, comprising a main control unit, a serial port unit, an Ethernet interface, a TF (Trans-flash) card interface and a status indicator, wherein the serial port unit, the Ethernet interface, the TF card interface and the status indicator are all electrically connected to the main control unit; the serial port unit comprises four serial ports which are separately connected to four central control units MPUs of the EMU train, that is, each central control unit MPU of the EMU train is connected to the main control unit via one serial port; the main control unit is connected to a PC via the Ethernet interface, and a configuration software corresponding to the monitoring system is provided inside the PC; and the main control unit is connected to a TF expansion card via the TF card interface, an MAP file and a configuration file are stored in the TF expansion card, and the main control unit records monitored offline variable values into the TF expansion card.

The present application further discloses a monitoring method based on the above-mentioned monitoring system, comprising three operating modes: a configuration mode, a working mode and a download mode. The three operating modes realize the monitoring of offline variables of MPUs of an EMU train by using a multithread operating system including a TCP/IP (Transmission Control Protocol/Internet Protocol) communication thread, a main control thread and a serial port data monitoring thread. The monitoring method specifically comprises the following steps:

1) powering on the monitoring system;
2) initializing the monitoring system;
3) activating a FreeRTOS real-time operating system of the main control unit, and establishing the TCP/IP communication thread, the main control thread and the serial port data monitoring thread;
4) activating the TCP/IP communication thread, and judging whether the operating system is in the configuration mode or download mode currently; if the operating system is in the configuration mode or the download mode, acquiring a configuration file or downloading an offline variable value; and, if the operating system is neither in the configuration mode nor in the download mode, returning to the step 4);

5) activating the main control thread, acquiring a current operating mode of the operating system, and judging whether the operating system is in the working mode currently; if the operating system is not in the working mode currently, returning to the step 5); and, if the operating system is in the working mode currently, reading the configuration file, loading a MAP file and an offline variable monitoring table, and setting sampling conditions for the offline variables;

6) judging whether the sampling conditions are fulfilled currently; if the sampling conditions are fulfilled, sending a sampling instruction; and, if the sampling conditions are not fulfilled, allowing the thread to enter a sleep mode, and returning to the step 6);

7) activating the serial port data monitoring thread, creating a serial port data queue, reading a serial port data, writing the serial port data into the serial port data queue, and waiting for the sampling instruction sent by the main control unit; and 8) when the sampling instruction is received, reading the serial port data queue, and judging whether the currently acquired offline variable value fulfills trigger conditions for data recording; if the trigger conditions are fulfilled, writing this offline variable value into the TF expansion card; and, if the trigger conditions are not fulfilled, returning to the step 6).

Compared with the prior art, the present application has the following beneficial effects:

1) the monitoring system of the present application is mounted in an electrical cabinet of an EMU train; and, when the train is running, the monitoring of logic control variables may be realized only when the corresponding interfaces of the monitoring system are connected to a PC and a TF expansion card, without opening the electrical cabinet;

2) when the train is running, the continuous monitoring of the logic control variables of the MPUs of the EMU train may be realized, without designating a person for attention;

3) the way of recording the monitored data may be configured flexibly, that is, the sampling time, the sampling period and the trigger conditions for data recording may be defined by the user;

4) the monitoring device may realize long-term monitoring of logic control variables, then store the monitored offline variable values into the TF expansion card so that the data can be downloaded for analysis as desired; and, 5) the monitoring of four central control units MPUs of the EMU train may be realized simultaneously, resulting in high flexibility.

DETAILED DESCRIPTION

In order to make the objectives, technical solutions and advantages of the embodiments of the present application clearer, the technical solutions in the embodiments of the present application will be described clearly and completely with reference to the accompanying drawings in the embodiments of the present application.

Embodiment 1

Figure 1:
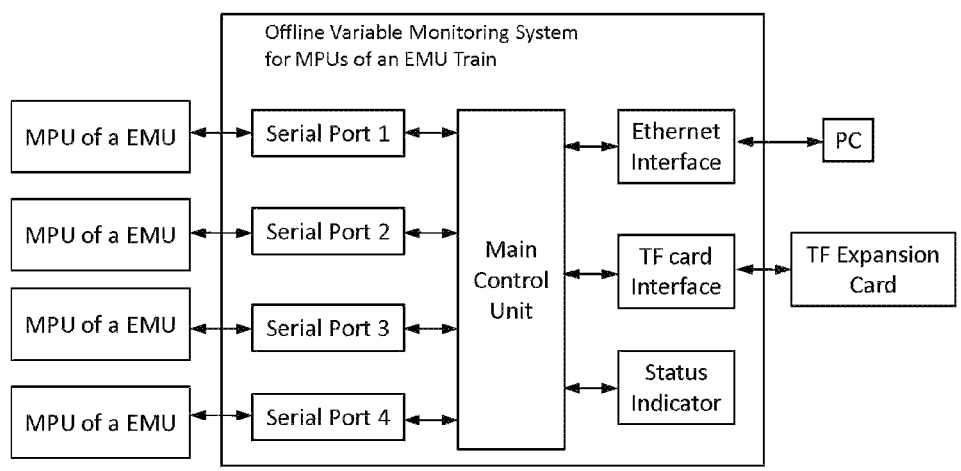
FIG. 1 is a schematic structure diagram of a monitoring system according to the present application.

Referring to FIG. 1, the present application discloses an offline variable monitoring system for MPUs of an EMU train, which is mounted inside an electrical cabinet of the EMU train and comprises a main control unit, a serial port unit, an Ethernet interface, a TF card interface and a status indicator, wherein the serial port unit, the Ethernet interface, the TF card interface and the status indicator are all electrically connected to the main control unit; the serial port unit is a multi-serial-port conversion module including four serial ports which are separately connected to four central control units MPUs of the EMU train to specifically read variable data in each central control unit MPU of the EMU train; the variable value acquired by each central control unit MPU of the EMU train may be set, that is, the variable value acquired by each central control unit MPU of the EMU train may be different; and, both the Ethernet interface and the TF card interface are provided at a rear side of the electrical cabinet of the EMU train, the main control unit is connected to a PC via the Ethernet interface, and configuration software corresponding to the monitoring system is provided inside the PC. When the train is running, the monitoring of the logic control variables may be realized without opening the electrical cabinet. The main control unit is connected to a TF expansion card via the TF card interface, an MAP file and a configuration file are stored in the TF expansion card, and the monitored offline variable value is recorded into the TF expansion card, so that the logic control variables can be downloaded and stored.

Wherein, the main control unit is an STM32F407 chip having a high-performance embedded processor with a Cortex-M4 kernel. A FreeRTOS real-time operating system runs in the main control unit, which may provide a multi-threaded operating environment. Threads running in the main control unit comprise a main control thread, a serial port data monitoring thread and a TCP/IP communication thread. The plurality of threads of the main control unit are communicated with each other via a semaphore and a queue, wherein the semaphore is a data type of multithread synchronization and the queue is a data type of first-in first-out.

Figure 2:
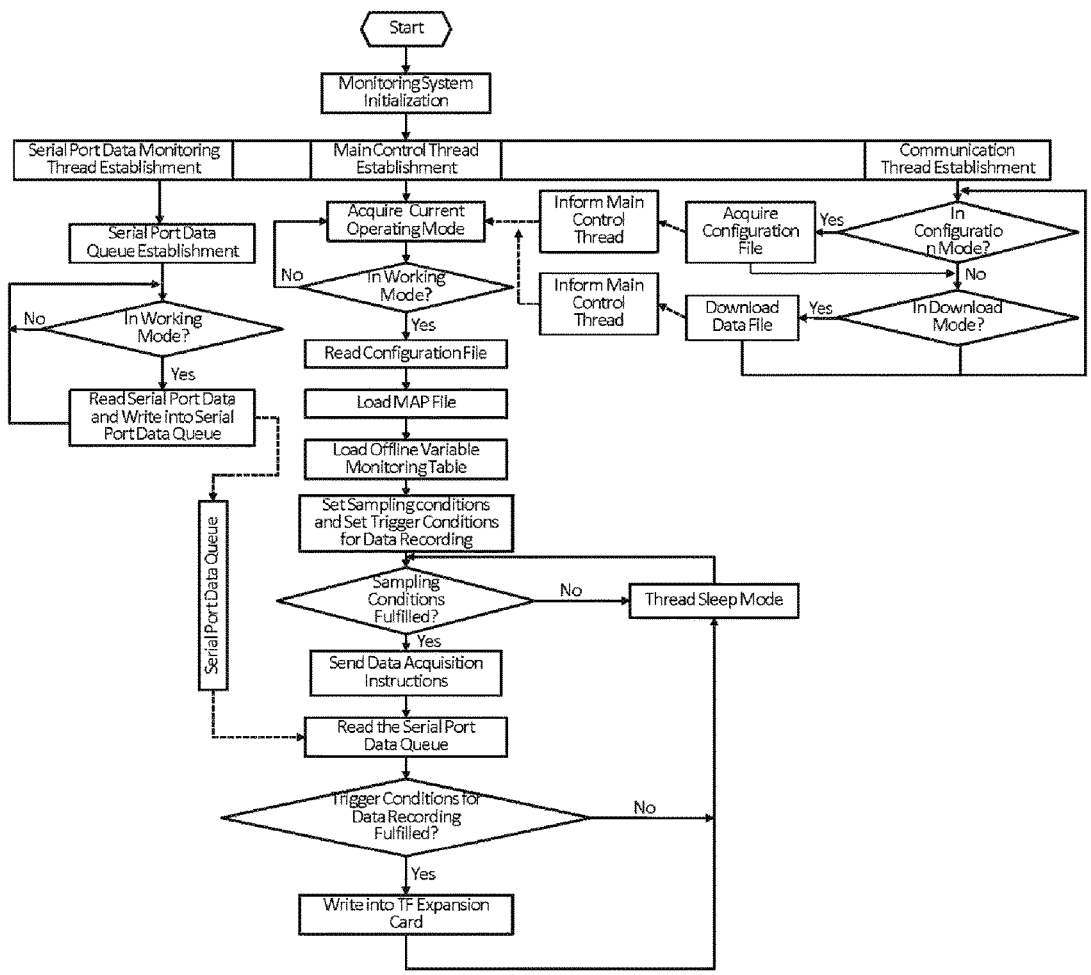
FIG. 2 is a flowchart of a monitoring method according to the present application.

Referring to FIG. 2, when the offline variable monitoring system for MPUs of an EMU train in the present application operates, the four serial ports are connected to the four central control units MPUs of the EMU train, respectively, and the Ethernet interface is connected to the PC via an Ethernet cable. When the monitoring system of the main control unit operates, a configuration mode, a working mode and a download mode are accomplished successively, so as to realize the offline monitoring of the logic control variables of the MPUs of the EMU train. The specific process is as follows:

1) The monitoring system is powered on.

2) The monitoring system is initialized, the initialization including setting of a clock frequency of the main control unit, initialization of the serial port unit, initialization of the Ethernet interface, and initialization of the TF card interface.

3) A FreeRTOS real-time operating system of the main control unit is activated, and the TCP/IP communication thread, the main control thread and the serial port data monitoring thread are established.

4) The TCP/IP communication thread is activated, and it is to be judged whether the operating system is in the configuration mode currently; if the operating system is in the configuration mode, the operating system acquires a configuration file and informs the main control thread of the current mode status; and, if the operating system is not in the configuration mode, the configuration indicator is lightened.

If the operating system is not in the configuration mode, it is to be judged whether the operating system is in the download mode; if the operating system is in the download mode, the operating system downloads the monitored offline variable value, and informs the main control thread of the current mode status; and, if the operating system is not in the download mode, the flow returns to the step 4).

In other words, in the step 4), when the operating system is in any running mode, the main control thread is to be informed of the current mode status in real time, and the main control thread is used for deploying the running status of each running mode.

In the step 4), it is to be judged whether there is any configuration software accessed within 30 s, as the criterion for judging whether the operating system enters the configuration mode. When there is configuration software accessed to the operating system within 30 s, the operating system enters the configuration mode and issues a configuration file.

5) The main control thread is activated to acquire the current operating mode of the operating system, and it is to be judged whether the operating system enters the working mode currently; if the operating system is not in the working mode currently, the flow returns to the step 5); and, if the operating system is in the working mode currently, the configuration file is read, an MAP file and an offline variable monitoring table are loaded, and sampling conditions for the offline variables are set.

In this step, the main control thread of the operating system acquires the current operating mode in real time, the operating mode including the working mode, the configuration mode and the download mode. If the operating system is in the configuration mode or the download mode currently, the operating system performs file configuration or file downloading. If the operating system is neither in the configuration mode nor in the download mode currently, the operating system enters the working mode.

Wherein, when the operating system is in the working mode, the file to be read includes the configuration file, the loaded MAP file and the offline variable monitoring table. Both the configuration file and the MAP file are stored in the TF expansion card. The configuration file comprises the name of the MAP file, the name of the offline variable monitoring table, the trigger conditions for data recording, and sampling conditions. The MAP file is an MAP conversion file of the central control units MPUs of the EMU train corresponding to the serial port units, and the MAP conversion file contains the name of the logic control variables and the address of the logic control variables. The offline variable monitoring table merely contains variables to be monitored, and is a subset of the MAP files. The sampling conditions comprise setting the sampling time and sampling period for offline variables.

6) It is to be judged whether the current offline variable monitoring time fulfills the sampling conditions; if the current offline variable monitoring time fulfills the sampling conditions, the main control unit sends a sampling instruction to the central control units MPUs of the EMU train via the serial port units; and, if the sampling conditions are not fulfilled, the thread enters the sleep mode, and the flow returns to the step 6).

In this step, when judging whether the sampling conditions are fulfilled, it is required to successively judge whether the current offline variable monitoring time fulfills the sampling time and the sampling period; and, if both the sampling time and the sampling period are fulfilled, step 7) will be performed.

7) The serial port data monitoring thread is activated, and a serial port data queue is created, the serial port data queue being a set of the acquired offline variable values; if it is in the working mode currently, the serial port data is read and written into the serial port data queue, and it is waiting for the sampling instruction sent by the main control unit.

In this step, the serial port data monitoring thread inquires in real time whether there is an offline variable value at each serial port unit. If there is an offline variable value, the acquired offline variable value is read and stored into the corresponding serial port data queue.

8) When the serial data monitoring thread receives the sampling instruction sent by the main control unit, the main control thread reads the serial port data queue, and judges whether the currently acquired offline variable value fulfills the trigger conditions for data recording; if the trigger conditions are fulfilled, this offline variable value is written into the TF expansion card; and, if the trigger conditions are not fulfilled, the flow returns to the step 6) to judge the sampling conditions again.

In the offline monitoring method of logic control variables of MPUs of an EMU train, the main control unit operates in a plurality of threads, and the configuration mode, the operation mode and the download mode are successively realized by creating the TCP/IP communication thread, the main control thread and the serial port data monitoring thread. Starting up by powering up to read the configuration file and the MAP file stored in the TF expansion card, the system configuration task is accomplished; and within a specified period of time, the communication with multiple central control units MPUs of the EMU train is performed by using the serial port unit on the basis of every specified sampling time and sampling period, so as to monitor the offline variable values of the multiple central control units MPUs of the EMU train. The offline variable monitoring system for MPUs of an EMU train in the present application can simultaneously monitor four central control units MPUs of the EMU train at most, and record the monitored offline variable values into the TF expansion card for downloading and analysis.

In the present application, when the offline variable monitoring system operates, the communication with multiple central control units MPUs of the EMU train is performed by using multiple serial ports, so that the processor time occupied by data between the serial ports may be balanced, and it is thus ensured that the data response from the central control units MPUs of the EMU train can be processed accurately and timely.

The invention claimed is:

1. An offline variable monitoring system for central control units of an electric multiple unit train, comprising a main control unit, a serial port unit, an Ethernet interface, a TF card interface and a status indicator, wherein the serial port unit, the Ethernet interface, the TF card interface and the status indicator are all electrically connected to the main control unit; the serial port unit comprises four serial ports which are separately connected to four central control units of the electric multiple unit train; the main control unit is connected to a PC via the Ethernet interface, and a configuration software corresponding to the monitoring system is provided inside the PC; and the main control unit is connected to a TF expansion card via the TF card interface, an MAP file and a configuration file are stored in the TF expansion card, and the main control unit records monitored offline variable values into the TF expansion card; wherein the offline variable values are real-time logic control variables, and are able to be recorded into the TF expansion card for downloading and storing.

2. The offline variable monitoring system for central control units of the electric multiple unit train according to claim 1, wherein an embedded real-time operating system runs in the main control unit, and the main control unit has a multithreaded operation; threads running in the main control unit comprise a main control thread, a serial port data monitoring thread and a TCP/IP communication thread; the threads of the main control unit are communicated with each other via a semaphore and a queue.

3. An offline variable monitoring method for central control units of an electric multiple unit train, using the monitoring system in claim 1, comprising the following steps:
1) powering on the monitoring system;
2) initializing the monitoring system;
3) activating an embedded real-time operating system of the main control unit, and establishing a TCP/IP communication thread, a main control thread and a serial port data monitoring thread;
4) activating the TCP/IP communication thread, and judging whether the operating system is in a configuration mode or in a download mode currently; if the operating system is in the configuration mode or in the download mode, acquiring a configuration file or downloading an offline variable value; and, if the operating system is neither in the configuration mode nor in the download mode, returning to the step 4);
5) activating the main control thread, acquiring a current operating mode of the operating system, and judging whether the operating system is in a working mode currently; if the operating system is not in the working mode currently, returning to the step 5); and, if the operating system is in the working mode currently, reading the configuration file, loading a MAP file and an offline variable monitoring table, and setting sampling conditions for the offline variables;
6) judging whether the sampling conditions are fulfilled currently; if the sampling conditions are fulfilled, sending a sampling instruction; and, if the sampling conditions are not fulfilled, allowing the thread to enter a sleep mode, and returning to the step 6);
7) activating the serial port data monitoring thread, creating a serial port data queue, reading a serial port data, writing the serial port data into the serial port data queue, and waiting for the sampling instruction sent by the main control unit; and
8) when the sampling instruction is received, reading the serial port data queue, and judging whether the currently acquired offline variable value fulfills trigger conditions for data recording; if the trigger conditions are fulfilled, writing this offline variable value into the TF expansion card; and, if the trigger conditions are not fulfilled, returning to the step 6).

4. The offline variable monitoring method for central control units of the electric multiple unit train according to claim 3, wherein the initialization comprises setting of a clock frequency of the main control unit, initialization of the serial port unit, initialization of the Ethernet interface, and initialization of the TF card interface.

5. The offline variable monitoring method for central control units of the electric multiple unit train according to claim 3, wherein, in the step 4), when judging whether the operating system is in the configuration mode or in the download mode currently; it is first to be judged whether the operating system is in the configuration mode;
if the operating system is in the configuration mode, the operating system acquires the configuration file and informs the main control thread of the current mode status;
if the operating system is not in the configuration mode, it is to be judged whether the operating system is in the download mode;
if the operating system is in the download mode, the operating system downloads the monitored offline variable value, and informs the main control thread of the current mode status; and,
if the operating system is not in the download mode, the flow returns to the step 4).

6. The offline variable monitoring method for central control units of the electric multiple unit train according to claim 3,
wherein, in the step 4), it is to be judged whether there is any configuration software accessed within 30s, as the criterion for judging whether the operating system enters the configuration mode;
when there is configuration software accessed to the operating system within 30s, the operating system enters the configuration mode and issues a configuration file.

7. The offline variable monitoring method for central control units of the electric multiple unit train according to claim 3, characterized in that,
wherein, in the step 5), the main control thread of the operating system acquires the current operating mode in real time;
the operating mode comprises the working mode, the configuration mode and the download mode;
if the operating system is in the configuration mode or the download mode currently, the operating system performs file configuration or file downloading; and
if the operating system is neither in the configuration mode nor in the download mode currently, the operating system enters the working mode.

8. The offline variable monitoring method for central control units of the electric multiple unit train according to claim 5,
wherein, in the step 4), it is to be judged whether there is any configuration software accessed within 30s, as the criterion for judging whether the operating system enters the configuration mode;
when there is configuration software accessed to the operating system within 30s, the operating system enters the configuration mode and issues a configuration file.

* * * * *